(12) United States Patent
Keller et al.

(10) Patent No.: US 11,284,315 B2
(45) Date of Patent: Mar. 22, 2022

(54) COMMUNICATION ESTABLISHMENT

(71) Applicant: Telefonaktiebolaget LM Ericsson (publ), Stockholm (SE)

(72) Inventors: Ralf Keller, Würselen (DE); Christer Gustafsson, Huddinge (SE); Åsa Larsen, Hisings Backa (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/761,866

(22) PCT Filed: Sep. 28, 2018

(86) PCT No.: PCT/EP2018/076534
§ 371 (c)(1),
(2) Date: May 6, 2020

(87) PCT Pub. No.: WO2019/101406
PCT Pub. Date: May 31, 2019

(65) Prior Publication Data
US 2021/0099925 A1    Apr. 1, 2021

Related U.S. Application Data

(60) Provisional application No. 62/589,148, filed on Nov. 21, 2017.

(51) Int. Cl.
*H04W 4/00* (2018.01)
*H04W 36/00* (2009.01)
(Continued)

(52) U.S. Cl.
CPC ....... *H04W 36/0066* (2013.01); *H04W 36/14* (2013.01); *H04W 36/32* (2013.01); *H04W 60/04* (2013.01); *H04W 76/27* (2018.02)

(58) Field of Classification Search
CPC . H04W 36/0066; H04W 76/27; H04W 36/14; H04W 36/32; H04W 60/04
(Continued)

(56) References Cited

U.S. PATENT DOCUMENTS 8,095,172 B1 * 1/2012 Cole ............... H04W 48/18
455/550.1
10,009,799 B2 * 6/2018 Hu ................. H04W 76/27
(Continued)

FOREIGN PATENT DOCUMENTS

CN    101370177 A    2/2009
WO    2016202363 A1    12/2016

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.5.0, Nov. 1, 2015, pp. 1-170, 3GPP.
3rd Generation Partnership Project, "3rd Generation Partnership Project; Technical Specification Group Services and System Aspects; Procedures for the 5G System; Stage 2 (Release 15)", Technical Specification, 3GPP TS 23.502 V1.3.0, Nov. 1, 2017, pp. 1-215, 3GPP.

(Continued)

*Primary Examiner* — Amancio Gonzalez
(74) *Attorney, Agent, or Firm* — Coats & Bennett, PLLC

(57) ABSTRACT

In an example aspect, a method performed by wireless device for communication establishment is provided. The method comprises, in response to a request for establishment of a communication with the wireless device using a first network, receiving a redirection instruction to redirect to a second network, and in response to whether a node in the second network supports communication with a node in the first network, selecting a first procedure or a second procedure for establishing the communication using the second network.

19 Claims, 8 Drawing Sheets

(51) Int. Cl.
 *H04W 76/27* (2018.01)
 *H04W 36/14* (2009.01)
 *H04W 36/32* (2009.01)
 *H04W 60/04* (2009.01)

(58) Field of Classification Search
 USPC .......................................................... 370/331
 See application file for complete search history.

(56) References Cited

U.S. PATENT DOCUMENTS

| | | | | |
|---|---|---|---|---|
| 10,568,012 | B2* | 2/2020 | Wu ........................ | H04W 76/10 |
| 10,772,022 | B2* | 9/2020 | Jheng ................... | H04W 36/165 |
| 11,019,538 | B2* | 5/2021 | Stojanovski .......... | H04W 76/50 |
| 11,122,533 | B2* | 9/2021 | Surisetty ................ | H04W 8/02 |
| 2011/0216744 | A1* | 9/2011 | Taaghol ................ | H04W 48/18 |
| | | | | 370/332 |
| 2015/0103744 | A1* | 4/2015 | Sun ....................... | H04W 60/04 |
| | | | | 370/328 |

OTHER PUBLICATIONS

Motorola Mobility et al., "OI#11—EPC Fallback and Handling of 5GC Services in DR-Mode of Operation", SA WG2 Meeting #123, Ljubljana, Slovenia, Oct. 23, 2017, pp. 1-3, S2-177679, 3GPP.

NTT Docomo et al., "OI#20: No-N26 Interworking Procedures", SA WG2 Meeting #122bis, Sofia-Antipolis, France, Aug. 21, 2017, pp. 1-17, S2-178126, 3GPP.

Nokia et al., "23.501: Editorial corrections and EN Removal", SA WG2 Meeting #124, Nov. 27-Dec. 1, 2017, pp. 1-160, Reno, Nevada, S2-178666.

Qualcomm Incorporated, "TS 23.501: Combined EPS/IMSI mobility in dual registration mode", SA WG2 Meeting #122bis, Aug. 21-25, 2017, pp. 1-8, Sophia Antipolis, France, S2-175589.

Motorola Mobility et al., "OI#11—EPC fallback and handling of 5GC services in DR-mode of operation", Oct. 23-27, 2017, pp. 1-4, Ljubljana, Slovenia, S2-177571.

Meng, Y., "Analysis on the Dual Connectivity Architecture between 5G and LTE", Nov. 21, 2017, pp. 27-31 (English Abstract only).

* cited by examiner

COMMUNICATION ESTABLISHMENT

TECHNICAL FIELD

Examples of the present disclosure relate to communication establishment, for example in response to a request for establishment of a communication with a wireless device using a first network and a redirection instruction to redirect to a second network.

BACKGROUND

A network may wish to transfer a connected wireless device to another network. In one example, a 5G network (e.g. 5GS or NG-RAN) may wish to hand over a wireless device to another network (e.g. E-UTRAN or EPS). Transfer from a 5G network to Evolved Packet System (EPS) may be referred to in some examples as Inter-Radio Access Technology (IRAT) Handover, and EPS Fallback may make use of IRAT handover. An example of communications 100 between various entities during EPS Fallback is shown in FIG. 1.

SUMMARY

One aspect of the present disclosure provides a method performed by wireless device for communication establishment. The method comprises, in response to a request for establishment of a communication with the wireless device using a first network, receiving a redirection instruction to redirect to a second network. The method also comprises, in response to whether a node in the second network supports communication with a node in the first network, selecting a first procedure or a second procedure for establishing the communication using the second network.

A further aspect of the present disclosure provides a method performed by a node in a second network for communication establishment. The method comprises, in response to whether a node in the second network supports communication with a node in a first network, carrying out a first procedure or a second procedure for establishing a communication involving a wireless device using the second network.

A still further aspect of the present disclosure provides apparatus for communication establishment. The apparatus comprises a processor and a memory. The memory contains instructions executable by the processor such that the apparatus is operable to, in response to a request for establishment of a communication with a wireless device using a first network, receive a redirection instruction to redirect to a second network, and in response to whether a node in the second network supports communication with a node in the first network, select a first procedure or a second procedure for establishing the communication using the second network.

An additional aspect of the present disclosure provides apparatus in a second network for communication establishment. The apparatus comprises a processor and a memory. The memory contains instructions executable by the processor such that the apparatus is operable to, in response to whether a node in the second network supports communication with a node in a first network, carry out a first procedure or a second procedure for establishing a communication involving a wireless device using the second network.

Another aspect of the present disclosure provides apparatus for communication establishment. The apparatus is configured to, in response to a request for establishment of a communication with the wireless device using a first network, receive a redirection instruction to redirect to a second network. The apparatus is also configured to, in response to whether a node in the second network supports communication with a node in the first network, select a first procedure or a second procedure for establishing the communication using the second network.

An additional aspect of the present disclosure provides apparatus in a second network for communication establishment. The apparatus is configured to, in response to whether a node in the second network supports communication with a node in a first network, carry out a first procedure or a second procedure for establishing a communication involving a wireless device using the second network.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

EPS Fallback may in some examples require IRAT handover support by a wireless device (e.g. a User Equipment, UE) and a network to which the wireless device is connected and/or communicating (e.g. NG-RAN and/or 5GC). With 5GC, for example, a N26 interface may be required between an Access Management Function (AMF) in 5GC and a Mobile Management Entity (MME), and may also require a SMF+PGW-C and UPF+PGW-U (which may also be called a common gateway (GW) in some examples), which may be referred to in some examples as tight-interworking.

In some examples disclosed herein, support for EPS Fallback of a wireless device (e.g. UE) from one network to another may be provided using redirect by a Radio Access Network (RAN), such as NG-RAN for example, both when an N26 interface is available between an AMF in the NG-RAN and e.g. a MME in a target E-UTRAN/EPS, and when N26 is not available. Hence, the NG-RAN may in some examples indicate redirect to the wireless device and not handover required to the AMF. However, further procedures in the target E-UTRAN/EPS may in some examples depend on whether N26 is available or not. In some examples, the N26 interface may alternatively referred to as a S10 interface. These terms are used interchangeably herein.

Figure 1:
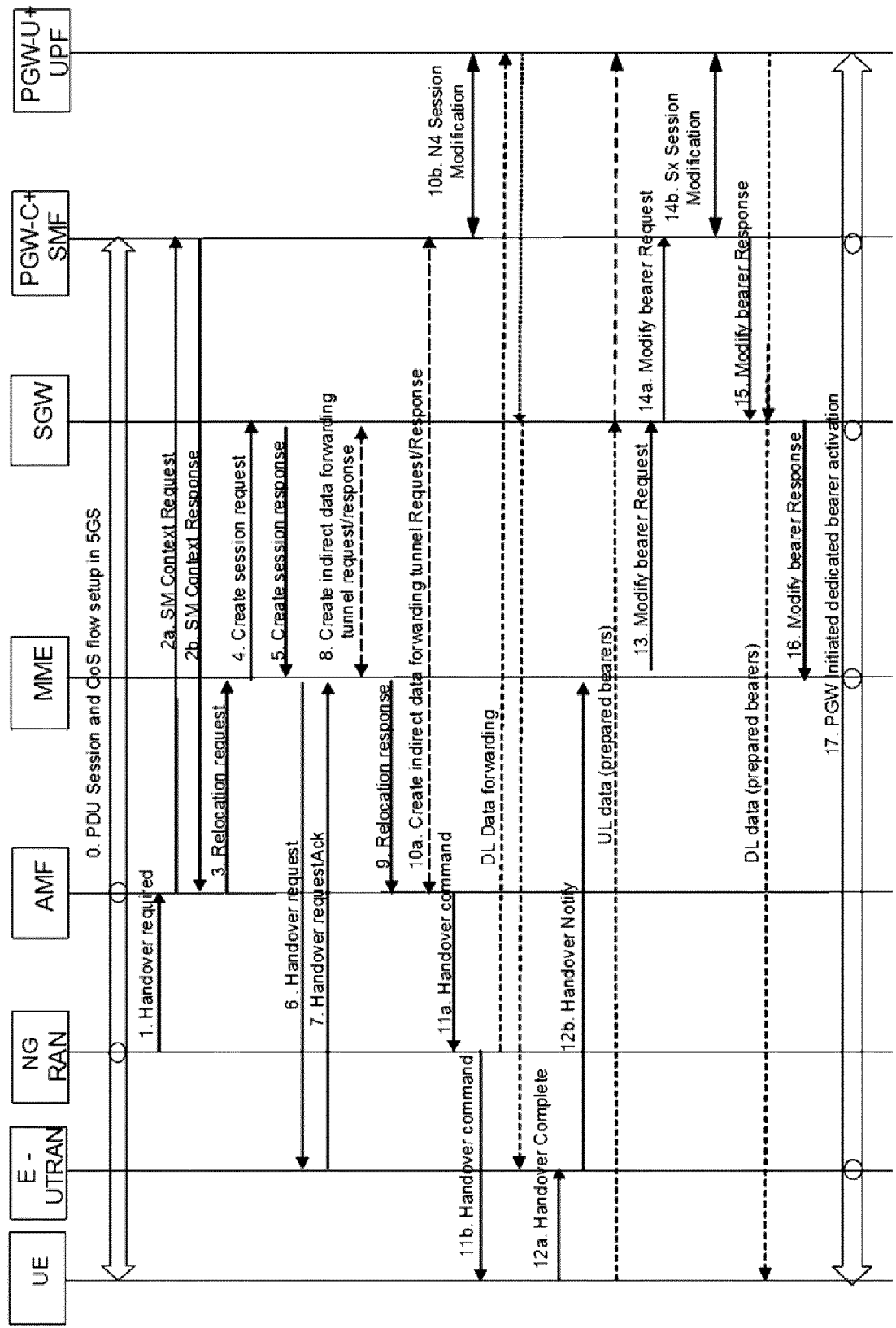
FIG. 1 shows an example of communications between various entities during EPS Fallback.
Figure 2:
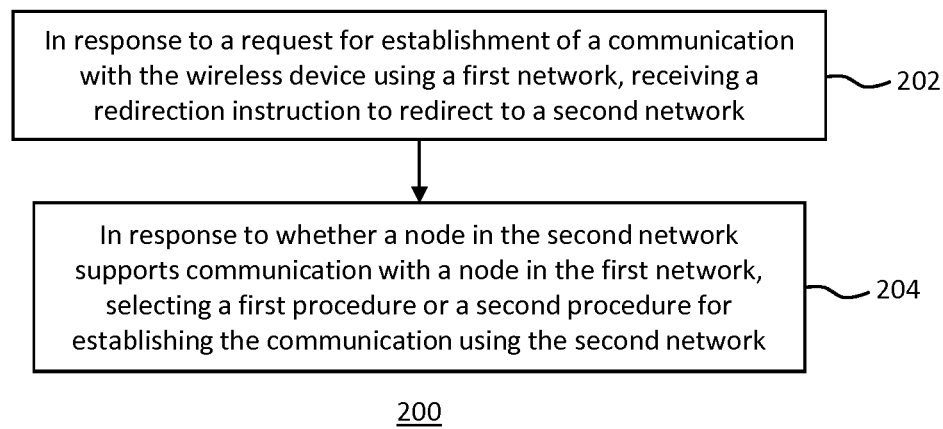
FIG. 2 is a flow chart of an example of a method performed by wireless device for communication establishment.

FIG. 2 is a flow chart of an example of a method 200 performed by wireless device (e.g. a User Equipment, UE) for communication establishment. The method 200 comprises, in step 202, in response to a request for establishment of a communication with the wireless device using a first network, receiving a redirection instruction to redirect to a second network. For example, the wireless device may receive a request for communication establishment, or may send a request for communication establishment. In some examples, the request for communication establishment may be a request to establish a voice call with the wireless device, such as for example an IP Multimedia Subsystem (IMS) voice call. In some examples, the first network may comprise a NG-RAN, 5G network or 5GC. The first network may in some examples not support the requested communication. For example, the first network may not support IMS voice or QoS for voice, or it may be preferred to carry IMS voice calls over the second network (e.g. LTE, E-UTRAN or EPS).

The method 200 also comprises, in step 204, in response to whether a node (e.g. MME) in the second network (e.g. LTE, E-UTRAN or EPS) supports communication with a node in the first network, selecting a first procedure or a second procedure for establishing the communication using the second network. For example, the selection of the first procedure or the second procedure may be based on whether or not the node in the first network (e.g. AMF) has a communication interface (e.g. N26 or S10) with the bode (e.g. MME) in the second network.

Therefore, for example, the wireless device may select a procedure for communication establishment (e.g. voice call) depending on capabilities of the networks, following a redirect instruction from the first network. The capabilities may be, for example, whether a node in the second network (e.g. "target network") can obtain information such as UE context information from the first network (e.g. "source network"). In some examples, the capabilities may comprise whether a MME in the second network (e.g. LTE, EPS or E-UTRAN) has a N26 or S10 interface for communication with an AMF in the first network (e.g. 5GS or NG-RAN). This information may in some examples be obtained by the wireless device upon registration with the first network or the second network, or may be received from the first network or otherwise determined by the wireless device.

If, in some examples, the node in the second network supports communication with the node in the first network, e.g. to obtain UE context information or other information that provides some details regarding connection status of the wireless device, the first procedure is selected. The first procedure may make use of the observation that for example the node in the second network may obtain information such as UE context information from the first network, such that the subsequent procedure to set up the communication through the second network can have a reduced amount of signalling when compared to the second procedure (where this information cannot be obtained from the first network). In the first procedure, in some examples, the wireless device may send a tracking area update (TAU) to the second network, which prompts the second network to obtain information such as for example UE context information from the first network (e.g. a MME in the second network contacts an AMF in the first network over a N26 or S10 interface). The communication through the second network (e.g. voice call) can then be setup.

The second procedure, for example if the node in the second network does not support communication with the node in the first network (e.g. to obtain information such as UE context information), may in some examples involve the wireless device sending an attach request with handover indication to the second network. This may require additional setup steps when compared to the first procedure. In some examples, a TAU request may be sent to the second network, and the second network may refuse the TAU request (e.g. by responding with a TAU reject message). In some examples, this may be used to determine whether the nodes in the first and second network support communication with each other.

In some examples, the method 200 comprises the wireless device determining whether the node in the second network supports communication with the node in the first network. This may comprise determining whether the node in the second network can communicate with the node in the first network using a N26 interface or a S10 interface, or otherwise determining whether the node in the second network can obtain context information for the wireless device from the first network. The wireless device may therefore for example determine whether the subsequent procedure to establish a connection to the second network can be performed with a reduced amount of signalling in cases where the node in the second network can obtain some information (e.g. context information) from the node in the first network.

For example, the first procedure may comprise, if the node in the second network supports communication with the node in the first network, sending a tracking area update (TAU) request to the second network, and receiving a TAU accept message in response to the TAU request sent to the second network. The TAU accept message may in some examples be an indication that the first procedure is being followed, or otherwise an indication that the node in the second network supports communication with the node in the first network. After sending the TAU to the second network, the method 200 may comprise completing setup of the communication over or using the second network. Completing setup of the communication may in some examples comprise using a bearer with a QCI in the second network.

In some examples, the second procedure comprises, if the node in the second network does not support communication with the node in the first network, sending an attach request to the second network. The attach request may in some examples include a handover indication or have a request type that indicates handover. The wireless device may then follow an attach procedure to attach to the second network and complete setup of the communication over the second network.

In some examples the second procedure comprises, if the node in the second network does not support communication with the node in the first network, creating a Packet Data Network (PDN) connection over the second network. A dedicated bearer for the communication may also be established over the second network using the PDN connection. The dedicated bearer may have a QoS Class Identifier (QCI) of 1 (conversational voice). After creating the PDN connection over the second network, setup of the communication over the second network may be completed in some examples.

In some examples, the request for establishment of a communication comprises at least one Radio Resource Control (RRC) message. The at least one RRC message may in some examples indicate that the wireless device has moved from an idle state to a connected state. Additionally or alternatively, the redirection instruction may comprise a RRC Connection Release message with redirection information.

The method 200 may in some examples comprise receiving an identification of the second network, for example from the first network such as in or along with the redirection instruction to redirect to the second network. The method 200 may also comprise registering with the second network identified by the identification.

In some examples, once the procedure has been selected, the method 200 comprises performing the selected procedure to establish the communication.

Figure 3:
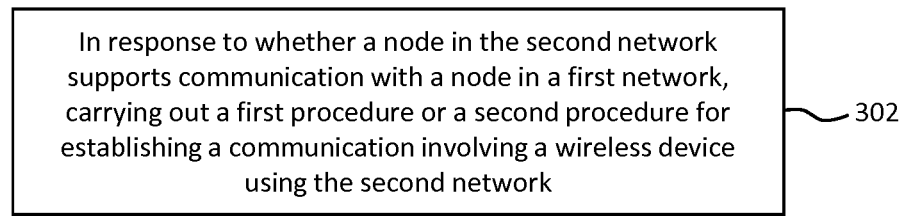
FIG. 3 is a flow chart of an example of a method performed by a node in a second network for communication establishment.

FIG. 3 is a flow chart of an example of a method 300 performed by a node in a second network for communication establishment. The node may be for example a MME, base station, eNB or other node in the second network, which may be for example an EPS, E-UTRAN or LTE network. The method 300 comprises, in response to whether a node in the second network supports communication with a node in a first network, carrying out a first procedure or a second procedure for establishing a communication involving a wireless device using the second network. The first network may be a 5G network, 5GC or NG-RAN. The node in the first network may be an AMF. In some examples, whether a node in the second network supports communication with a node in a first network may depend on whether a N26 or S10 interface is present between the nodes in the first and second networks.

In some examples, the first procedure comprises, if the node in the second network supports communication with the node in the first network, receiving a tracking area update (TAU) request from the wireless device and sending a TAU accept message to the wireless device in response to the TAU. The method 300 may then comprise, for example, after receiving the TAU, obtaining context information for the wireless device from the first network in response to receiving the TAU, and/or completing setup of the communication over the second network using a bearer with a QCI obtained from the first network (e.g. in the context information). In some examples, the second procedure may comprise receiving a TAU request, and responding with a TAU reject message, for example if the node is aware that it cannot obtain context information for the wireless device or that no N26 or S10 interface is present between the node and the node in the first network.

In some examples the second procedure comprises, if the node in the second network does not support communication with the node in the first network, receiving an attach request to the second network. The attach request may include a handover indication or have a request type that indicates handover. Additionally or alternatively, the second procedure may comprise, if the node in the second network does not support communication with the node in the first network, creating a PDN connection over the second network. This may also comprise establishing a default bearer for the communication over the second network using the PDN connection, such as for example a bearer with QCI of 1. In some examples, the method 300 may comprise completing setup of the communication over the second network after creating the PDN connection over the second network.

Some examples of this disclosure may provide one or more technical advantages. For example, some examples may enable EPS Fallback without IRAT handover support in both NG-RAN and 5GC. Additionally or alternatively, some examples may allow for efficient fallback that takes into account whether communication between certain nodes in source and target networks (e.g. a N26 interface between AMF in NG-RAN and MME in EPS/E-UTRAN) is available.

Further examples will now be described more fully with reference to the accompanying drawings. Other embodiments, however, are contained within the scope of the subject matter disclosed herein, and the disclosed subject matter should not be construed as limited to only the embodiments set forth herein. Rather, these examples are provided by way of example to convey the scope of the subject matter to those skilled in the art.

Some examples may provide EPS Fallback with redirect and handover attach. This may be the case for example when there is no N26 or S10 interface between AMF in 5GS and MME in EPS, hence there may be no possibility for the MME to fetch the context from the AMF. This may also be the case in an alternative scenario where the N26 or S10 interface exists, but it is not used or is not signaled as available (e.g. to the wireless device or UE) by the 5GS/NG-RAN network or the EPS/E-UTRAN/LTE network. The UE may then perform a handover with attach indication (e.g. to the second network, such as the EPS/E-UTRAN/LTE network) and this may trigger the actions described below. In this example, it may be assumed that the wireless device and the target network support attach with handover indication, the wireless device and first network (e.g. source network) support redirect with EPS Fallback indication, and the networks support a common gateway, so there may be no N26 interface as a result.

1) If a QoS Flow for voice is requested to be established, the base station (e.g. gNB) in the source network releases the UE with an indication on the target network (release with redirect) and an EPS Fallback indication 2) The wireless device, upon receiving the release with redirect with EPS Fallback indication, moves to the target network, e.g. E-UTRAN.

The 3) wireless device performs an Attach procedure in the EPC (associated with the E-UTRAN) with a Request type "Handover" in a PDN CONNECTIVITY Request message. This causes a first PDN connection to be established.

4) A dedicated bearer for audio may be established after PDN connection to the IMS APN has been established over E-UTRAN.

Figure 4:
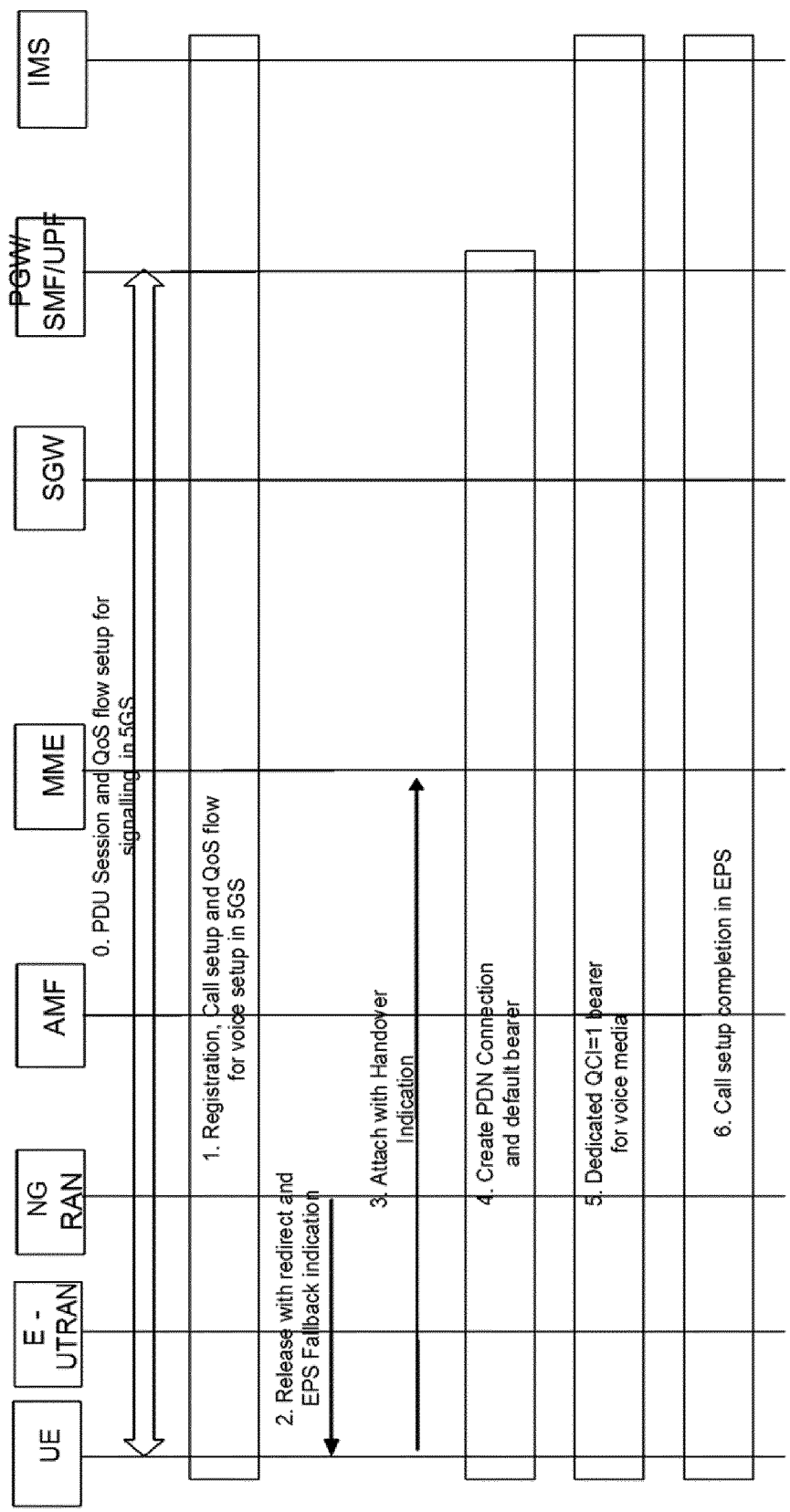
FIG. 4 shows an example of communications between various entities during EPS Fallback with redirect and handover attach.

FIG. 4 shows an example of communications 400 between various entities during EPS Fallback with redirect and handover attach.

Some examples may provide EPS Fallback with redirect and Tracking Area Update (TAU). This may be the case for example when there is the possibility of communication between nodes in networks (e.g. N26 or S10 interface between AMF in 5GS/NG-RAN and MME in EPS/E-UTRAN), hence the MME can fetch the wireless device or UE context from the AMF for example. The UE may perform a TAU (e.g. in the second or target network) and this may trigger further actions as described below. In this example, it may be assumed that the wireless device and network(s) support redirect with EPS Fallback indication, the networks support a N26 interface between nodes (e.g. MME and AMF), and also the networks may support a common gateway.

1) If the QoS Flow for voice is established, and the wireless device is informed about it, the base station (e.g. gNB) releases the wireless device with an indication on the target network (release with redirect) and an EPS Fallback indication.

2) The wireless device, upon receiving the release with redirect with EPS indication, moves to the target network (e.g. E-UTRAN)

3) The wireless device performs a TAU in the target network.

4) The MME in the target network fetches the wireless device (e.g. UE) context from the AMF (e.g. based on a Globally Unique Temporary Identifier, GUTI).

Figure 5:
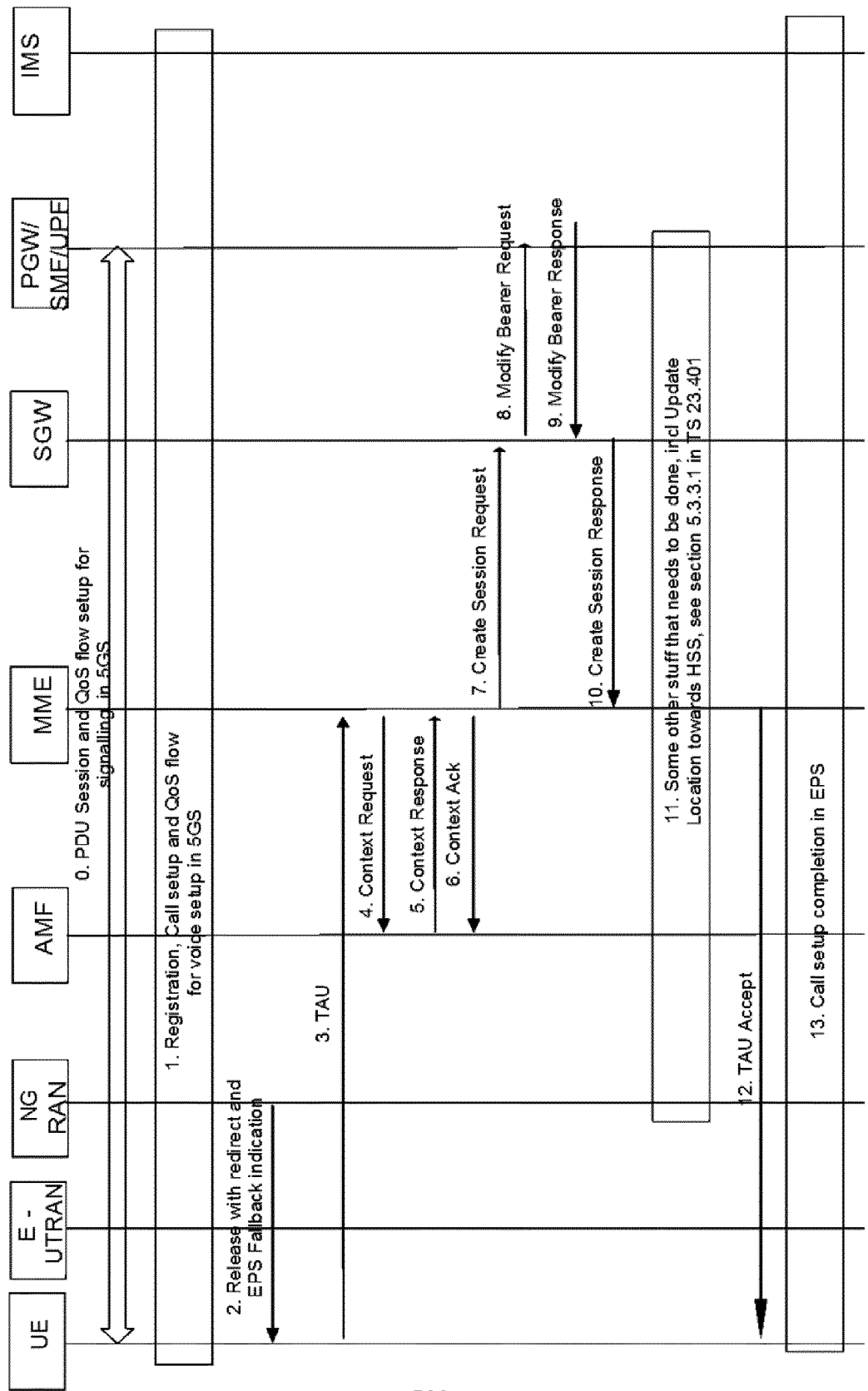
FIG. 5 shows an example of communications between various entities during PS Fallback with redirect and Tracking Area Update (TAU)

FIG. 5 shows an example of communications 500 between various entities during PS Fallback with redirect and Tracking Area Update (TAU).

Figure 6:
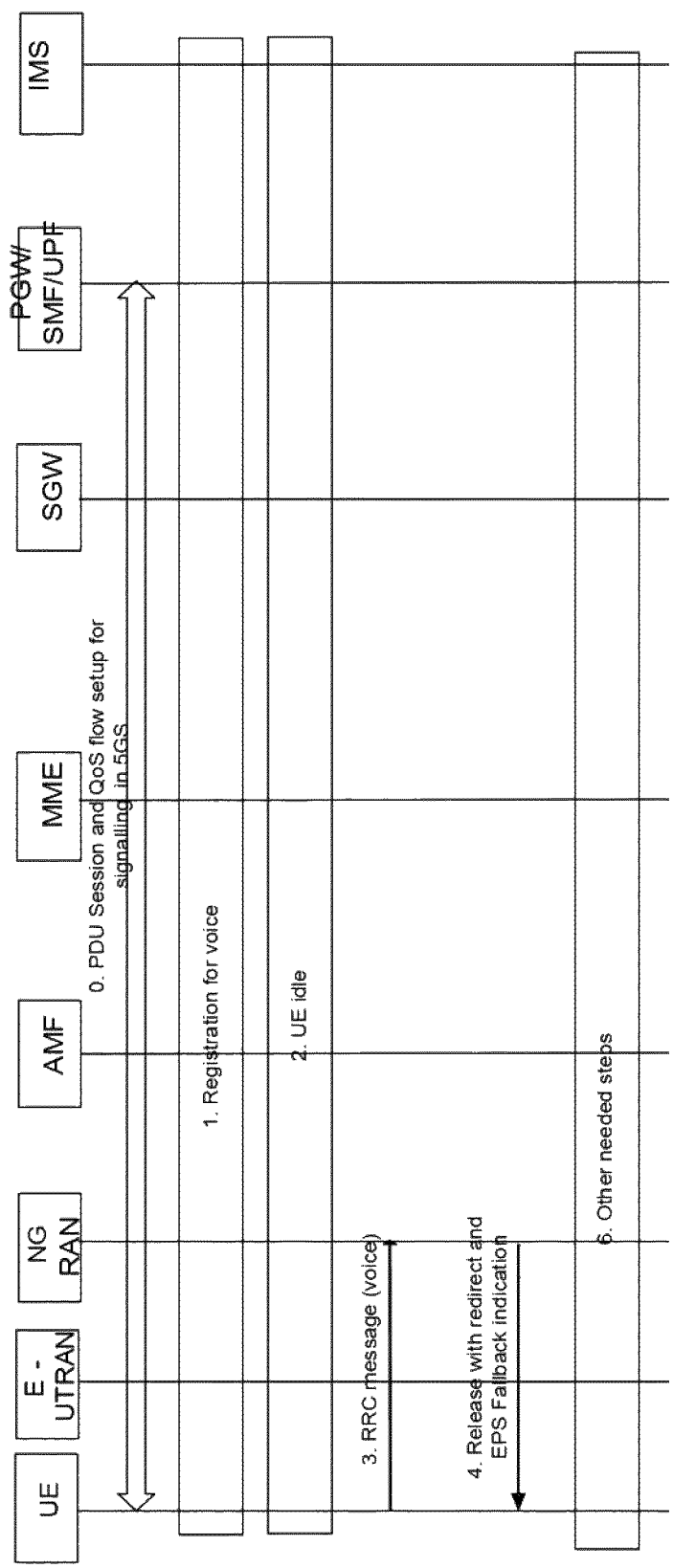
FIG. 6 shows an example of communications between various entities during EPS Fallback initiated via Radio Resource Control (RRC)

Some examples may provide EPS Fallback initiated via Radio Resource Control (RRC). In this additional case, the EPS fallback procedure may be initiated if the wireless device (e.g. UE) moves from an idle to active state and indicates this to the RAN via RRC, including an indication as to whether the reason is due to an originating voice call or due to an originating emergency call. FIG. 6 shows an example of communications 600 between various entities during EPS Fallback initiated via Radio Resource Control (RRC). In some examples, for an originating call (a call that is originated at the wireless device), the wireless device (e.g. UE) may indicate via RRC when moving from the idle to connected state whether the cause for moving to the connected state was due to a voice or emergency call. If there is an originating emergency call and the wireless device is idle, the wireless device may not yet have established a PDU session for the emergency call, so if redirected to EPS directly, will establish emergency PDN connection in EPS.

Figure 7:
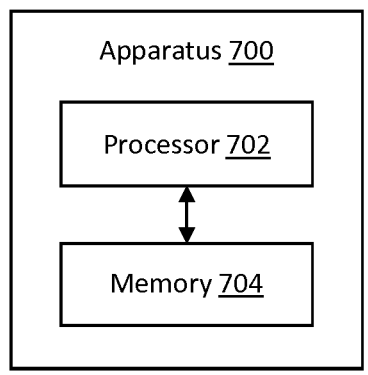
FIG. 7 is a schematic of an example of apparatus for communication establishment.

FIG. 7 is a schematic of an example of apparatus 700 (e.g. a wireless device or UE) for communication establishment. The apparatus 700 comprises a processor 702 and a memory 704. The memory 704 contains instructions executable by the processor 702 such that the apparatus 700 is operable to, in response to a request for establishment of a communication with a wireless device using a first network, receive a redirection instruction to redirect to a second network, and in response to whether a node in the second network supports communication with a node in the first network, select a first procedure or a second procedure for establishing the communication using the second network.

Figure 8:
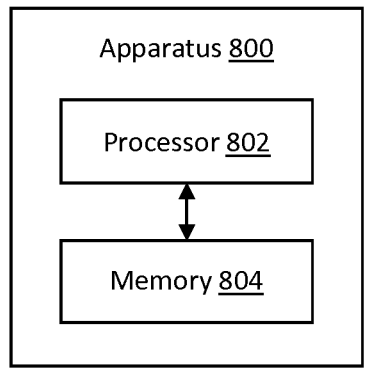
FIG. 8 is a schematic of another example of apparatus for communication establishment.

FIG. 8 is a schematic of an example of apparatus 800 (e.g. a node in a network) for communication establishment. The apparatus 800 comprises a processor 802 and a memory 804. The memory 804 contains instructions executable by the processor 802 such that the apparatus 800 is operable to, in response to whether a node in the second network supports communication with a node in a first network, carry out a first procedure or a second procedure for establishing a communication involving a wireless device using the second network.

Figure 9:
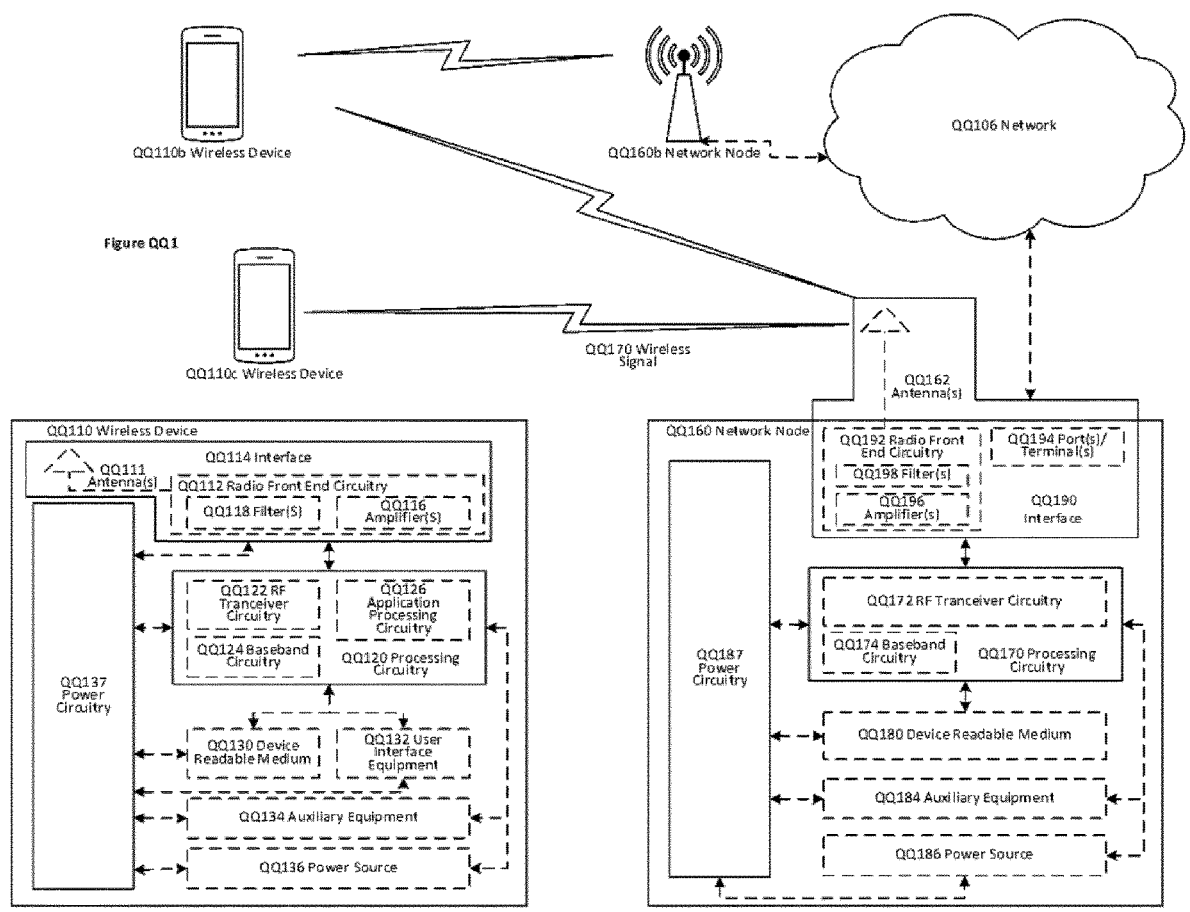
FIG. 9 shows an example of a wireless network.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Alternative embodiments of network node QQ160 may include additional components beyond those shown in FIG. 9 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 10:
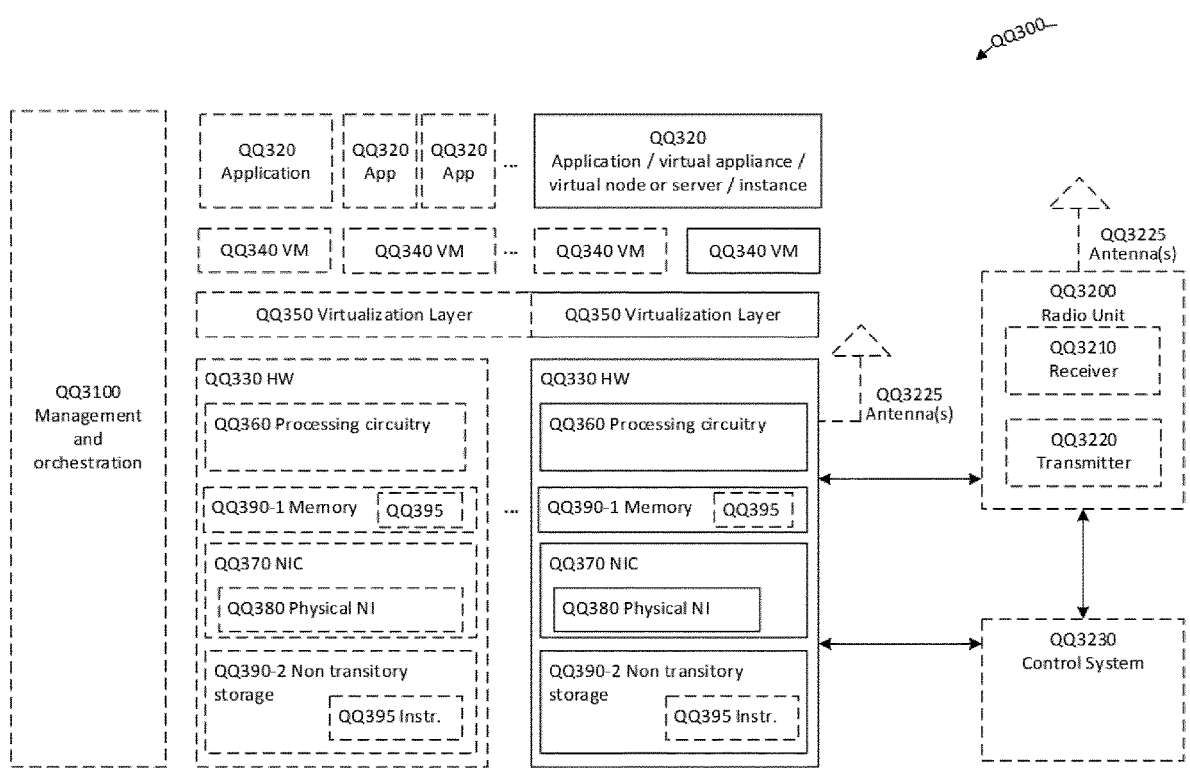
FIG. 10 is a schematic block diagram illustrating an example of a virtualization environment.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method, performed by wireless device, for communication establishment, the method comprising the wireless device:
   determining, from information received from a first network, whether an Access and Mobility Management Function (AMF) in the first network is using an N26 interface to a Mobility Management Entity (MME) in a second network;
   in response to a request for establishment of a communication with the wireless device using the first network, receiving a redirection instruction to redirect to the second network; and
   in response to whether the AMF in the first network is using an N26 interface to the MME in the second network, selecting a first procedure or otherwise a second procedure for establishing the communication using the second network.

2. The method of claim 1, further comprising receiving the information from the first network upon registration with the first network.

3. The method of claim 1, wherein the determining whether the AMF in the first network is using an N26 interface to the MME in the second network comprises determining whether the MME in the second network can obtain context information for the wireless device from the first network.

4. The method of claim 1, wherein the first procedure comprises:
   sending a tracking area update (TAU) request to the second network; and
   receiving a TAU accept message in response to the TAU request sent to the second network.

5. The method of claim 4, further comprising completing setup of the communication using a bearer with a Quality of Service Class Identifier (QCI) in the second network.

6. The method of claim 5, wherein the second procedure comprises sending an attach request to the second network.

7. The method of claim 6, wherein the attach request includes a handover indication or has a request type that indicates handover.

8. The method of claim 1, wherein the redirection instruction comprises an Radio Resource Control (RRC) Connection Release message with redirection information.

9. The method of claim 1, wherein the first network comprises a Next-Generation Radio Access Network (NG-RAN).

10. The method of claim 1, wherein the second network comprises an Evolved Universal Mobile Telecommunications System Terrestrial Radio Access Network (E-UTRAN).

11. The method of claim 1, wherein the communication comprises a voice communication.

12. The method of claim 1, further comprising determining that the communication is unavailable over the first network.

13. The method of claim 12, wherein the determining that the communication is unavailable over the first network comprises receiving an indication that the communication is unavailable over the first network, wherein the indication that the communication is unavailable over the first network comprises an instruction for the wireless device to fall back to using an Evolved Packet System (EPS) in the second network.

14. The method of claim 1, wherein the wireless device is a User Equipment (UE).

15. The method of claim 1, further comprising registering with the first network before the request for establishment of the communication.

16. The method of claim 1, further comprising, in response to the redirection instruction, moving to the second network.

17. The method of claim 1, further comprising performing the selected procedure to establish the communication.

18. A non-transitory computer readable recording medium storing a computer program product for controlling a wireless device for communication establishment, the computer program product comprising program instructions which, when run on processing circuitry of the wireless device, causes the wireless device to:

determine, from information received from a first network, whether an Access and Mobility Management Function (AMF) in the first network is using an N26 interface to a Mobility Management Entity (MME) in a second network;

receive, in response to a request for establishment of a communication with the wireless device using the first network, a redirection instruction to redirect to the second network; and select, in response to whether the AMF in the first network is using an N26 interface to the MME in the second network, a first procedure or otherwise a second procedure for establishing the communication using the second network.

19. An apparatus for communication establishment, the apparatus comprising:

processing circuitry;

memory containing instructions executable by the processing circuitry whereby the apparatus is operative to:

determine, from information received from a first network, whether an Access and Mobility Management Function (AMF) in the first network is using an N26 interface to a Mobility Management Entity (MME) in a second network;

in response to a request for establishment of a communication with a wireless device using the first network, receive a redirection instruction to redirect to the second network; and in response to whether the AMF in the first network is using an N26 interface to the MME in the second network, select a first procedure or otherwise a second procedure for establishing the communication using the second network.

* * * * *